(12) United States Patent
Weber et al.

(10) Patent No.: US 9,914,250 B2
(45) Date of Patent: Mar. 13, 2018

(54) RETENTION OF MAGNETIC PROPERTIES

(71) Applicant: Apple Inc., Cupertino, CA (US)

(72) Inventors: Douglas Joseph Weber, Arcadia, CA (US); Julio C. Quintero, Los Gatos, CA (US); Benjamin M. Rappoport, San Francisco, CA (US); Harry W. Smith, IV, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 595 days.

(21) Appl. No.: 13/955,996

(22) Filed: Jul. 31, 2013

(65) Prior Publication Data

US 2014/0174607 A1    Jun. 26, 2014

Related U.S. Application Data

(60) Provisional application No. 61/745,479, filed on Dec. 21, 2012.

(51) Int. Cl.
*B29C 45/14* (2006.01)
*B29C 45/78* (2006.01)

(52) U.S. Cl.
CPC ........ *B29C 45/14836* (2013.01); *B29C 45/78* (2013.01); *B29C 2945/76157* (2013.01); *B29C 2945/76294* (2013.01); *B29C 2945/76531* (2013.01); *B29C 2945/76545* (2013.01); *B29C 2945/76772* (2013.01); *B29C 2945/76782* (2013.01); *B29C 2945/76933* (2013.01); *B29K 2995/0008* (2013.01)

(58) Field of Classification Search
CPC ........... B29C 2945/76157; B29C 2945/76782; B29C 2945/76933; B29C 45/14836; B29C 45/78; B29C 33/04; B29C 2945/76531; B29C 2945/76545; B29C 2945/76772; B29C 2945/7629; B29K 2995/0008
USPC ............ 266/87; 148/121; 427/226; 264/263, 264/273, 274, 275, 279.1, 528, 530, 237, 264/327, 428, 611, 612, 642
See application file for complete search history.

(56) References Cited

U.S. PATENT DOCUMENTS 5,484,491 A * 1/1996 Iwasaki .................... G11B 5/31
                                                          148/313
6,196,824 B1 * 3/2001 Foltuz ................. B29C 45/2673
                                                          425/190

(Continued)

*Primary Examiner* — Scott Kastler
*Assistant Examiner* — Michael Aboagye
(74) *Attorney, Agent, or Firm* — Downey Brand LLP (57) ABSTRACT

Methods, systems, and apparatuses for retaining magnetic properties of magnetic elements while undergoing manufacturing processes are presented. In one embodiment, a manufacturing fixture includes a temperature controlled region suitable for retaining a magnetic element. The manufacturing fixture also includes a cooling mechanism configured to maintain the magnetic element at an acceptable temperature range during a thermally active manufacturing process. The temperature controlled or stabilized region can include a structure configured to receive the magnetic element and a sensor, or sensors. In one embodiment, the sensor can be configured to measure an ambient temperature of the temperature stabilized region. In another embodiment, the sensor can be a magnetic sensor configured to determine a magnetic property of the magnetic element.

8 Claims, 6 Drawing Sheets

(56) References Cited

U.S. PATENT DOCUMENTS 6,312,628 B1 * 11/2001 Wieder ............... B29C 45/7306
  264/328.16
7,985,363 B2 * 7/2011 Somple ................... B29C 70/72
  264/263

* cited by examiner

RETENTION OF MAGNETIC PROPERTIES

CROSS-REFERENCE TO RELATED APPLICATIONS

This application claims the benefit of U.S. Provisional Patent Application No. 61/745,479, filed Dec. 21, 2012 and entitled "RETENTION OF MAGNETIC PROPERTIES" by Rappoport et al., which is incorporated by reference in its entirety for all purposes.

TECHNICAL FIELD

The present discussion relates generally to magnetic properties of magnets and more particularly to retaining magnetic properties of magnets during processing at elevated temperatures.

BACKGROUND

Magnets are becoming more and more common in consumer products. In particular, magnets can be found in computing device such as laptops, covers for tablet devices, wearable devices such as wrist straps, and so on. Generally speaking it is preferable that magnets provide as strong a magnetic field as possible in as small a space as possible. Accordingly magnets that provide a high magnetic flux density and yet are relatively small in size can be used in a number of applications. Unfortunately, elevated temperatures can cause magnets to become partially or totally demagnetized. In particular, high flux density magnets such as neodymium (NIB) magnets are highly sensitive to elevated temperatures. More particularly, the strongest grade (N50 to N52 range) magnets can experience serious demagnetization at relatively low temperatures. For example, a NIB magnet of grade N52 can have a maximum operating temperature of about 50° C. above which the desired magnetic properties (such as magnetic strength expressed as magnetic flux density, for example) of the NIB magnet will seriously degrade. Unfortunately, however, in order to effectuate magnets in various consumer products, a thermally active manufacturing process (such as injection molding) is used in which a thermoplastic or resin at an elevated temperature exposes the magnetic element to temperatures above the maximum operating temperature. In these situations, the magnetic element can suffer serious demagnetization.

Therefore, what is needed is a way to configure magnets to be able to withstand elevated temperatures without losing some or all of their magnetic properties.

SUMMARY

The present application describes various embodiments regarding systems and methods for maintaining magnetic properties of a magnet at an acceptable value during a heat based manufacturing process.

In one embodiment, a fixturing device for maintaining magnetic properties of a magnetic element during a thermally active manufacturing process is disclosed. The fixturing device includes at least the following elements: a fixturing device housing having walls that define a cavity; a magnetic element retaining feature disposed within the cavity and configured to retain the magnetic element within the cavity of the fixturing device housing; a sensor configured to provide information in accordance with a characteristic of the magnetic element; and a cooling mechanism in communication with the sensor and having a transport conduit embedded at least partially within the walls of the fixturing device housing. The cooling mechanism is configured to move coolant medium through the transport conduit and into thermal contact with the magnetic element during the thermally active manufacturing process in response to information received from the sensor.

In another embodiment, a magnetic element can include a thermal isolation layer. The thermal isolation layer can act to increase a thermal resistance between the magnetic element and an external environment. The thermal isolation layer can effectively isolate the magnetic element from heat associated with the external environment. In this way, the magnetic properties of the magnetic element can be maintained within an acceptable level during a thermally active manufacturing process.

In another embodiment a method of maintaining a magnetization value of a magnetic element during a thermally active manufacturing process is described. The method can be carried out by determining a current temperature of the magnetic element and comparing the current temperature to a predetermined temperature limit. In some aspects of the described embodiment, the predetermined temperature can be below a critical operating temperature being that temperature at which a magnetization of the magnetic element is reduced below a first threshold. If the current temperature of the magnetic element is determined to be at or above the predetermined temperature limit, then cooling resources are provided until the current temperature of the magnetic element is determined to be within an acceptable temperature range.

In yet another embodiment, a method of maintaining a magnetization value of a magnetic element during a thermally active manufacturing process is described. The method is carried out by measuring a current magnetic property of the magnetic element. The magnetic property can be related to a magnetic flux density of the magnetic element. The magnetic property can be related to a magnetic strength value. The magnetic property can be determined using a magnetometer. The magnetic property can be monitored during the thermally active manufacturing process. The magnetic property can trigger the providing of and an amount of cooling resources provided to the magnetic element. For example, a decrease in the measured magnetic property can cause an increase in an amount of cooling resources provided. In this way, the amount of cooling resources can be directly related to a measured magnetic property.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following paper describes a system and method suitable for maintaining magnetic properties of magnetic element during a thermally active manufacturing process. For example, a magnet can be embedded in an elastomeric material and/or thermoplastic resin during an injection molding process. Any temperature related degradation of magnetic properties can be reduced or avoided altogether. In one embodiment, a manufacturing fixture includes a temperature controlled region suitable for retaining a magnetic element. The manufacturing fixture also includes a cooling mechanism configured to maintain the magnetic element at an acceptable temperature range during a thermally active manufacturing process. The temperature controlled or stabilized region can include a structure configured to receive the magnetic element and a sensor, or sensors. In one embodiment, the sensor can be configured to measure an ambient temperature of the temperature stabilized region. In another embodiment, the sensor can be a magnetic sensor configured to determine a magnetic property of the magnetic element.

Using information from the sensor, the cooling mechanism can mitigate any adverse changes to a temperature sensitive property of the magnetic element. For example, an ambient temperature of the temperature stabilized region can be maintained within an acceptable temperature range. In one embodiment, thermal feedback control between a temperature sensor in the temperature stabilized region and the cooling mechanism can be used. In another embodiment, a magnetic sensor can provide a signal corresponding to a measured value of a magnetic parameter of the magnetic element to a feedback controller that uses the signal to maintain to the desired magnetic property by adjusting a temperature of the magnetic element. The sensor can take the form of a magnetometer. For example, a change in a measured magnetic property of the magnetic element below a specific threshold can be used as a trigger to control an amount of cooling provided by the cooling mechanism.

In another embodiment, a magnetic element can include a thermal isolation layer. The thermal isolation layer can act to increase a thermal resistance between the magnetic element and heat associated with an external environment. The thermal isolation layer can effectively isolate the magnetic element from the external environment. In this way, the magnetic properties of the magnetic element can be maintained within an acceptable level during a thermally active process.

In another embodiment a method of maintaining a magnetization value of a magnetic element during a thermally active manufacturing process is described. The method can be carried out by determining a current temperature of the magnetic element and comparing the current temperature to a predetermined temperature limit. In some aspects of the described embodiment, the predetermined temperature can be below a critical operating temperature being that temperature at which a magnetization of the magnetic element is reduced below a first threshold. If the current temperature of the magnetic element is determined to be at or above the predetermined temperature limit, then cooling resources are provided until the current temperature of the magnetic element is determined to be within an acceptable temperature range.

In yet another embodiment, a method of maintaining a magnetization value of a magnetic element during a thermally active manufacturing process is described. The method is carried out by measuring a current magnetic property of the magnetic element. The magnetic property can be related to a magnetic flux density of the magnetic element. The magnetic property can be related to a magnetic strength value. The magnetic property can be determined using a magnetometer. The magnetic property can be monitored during the thermally active manufacturing process. The magnetic property can trigger the providing and amount of cooling resources provided to the magnetic element. A decrease in the measured magnetic property can cause an increase in an amount of cooling resources provided. In this way, the amount of cooling resources can be directly related to a measured magnetic property.

According to the embodiments described herein, a magnetic element can be embedded within a substrate while maintaining desired magnetic properties. The thermally active process includes at least an injection molding process, molding magnets in thermosets (such as, for example, compression molded rubbers), laminating magnets inside of soft materials (such as stackups of TPU, neoprene, leather, cotton, microfibers, and polyesters). By maintaining the original magnetic properties of the magnetic element, the need for re-magnetizing the magnetic element can be greatly reduced or even eliminated. In this way, complex magnetic patterns (used, for example, in auto location applications) can be more easily maintained.

This and other embodiments are discussed below with reference to the many Figures. However, those skilled in the art will readily appreciate that the detailed description given herein with respect to these figures is for explanatory purposes as the invention extends beyond these limited embodiments.

Figure 1A:
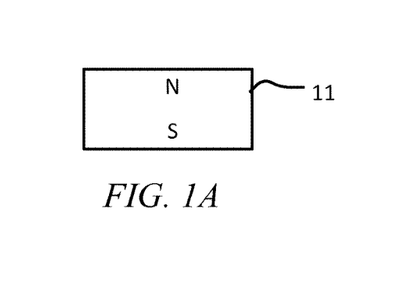
FIGS. 1A-1E show by way of example magnetic elements useable in thermally active processes.
Figure 1B:
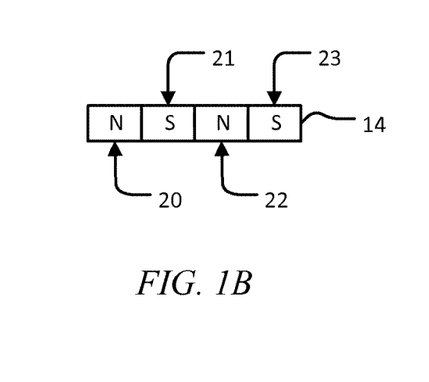

FIGS. 1A-1E show by way of example magnetic elements useable in thermally active processes. As depicted in FIG. 1A, a magnetic element 11 may include two magnetic poles useful in attracting other magnetic elements and/or ferromagnetic materials. For example, the magnetic element 11 may be embedded within a substrate and used to attract, lock, engage, or otherwise exert attractive/repulsive forces on a neighboring substrate (or material embedded in the substrate). Although only two poles are illustrated, the same may be varied by forming arrays of magnets or magnetic elements. As depicted in FIG. 1B, a magnetic element 14 may be formed from a plurality of magnetic elements 20, 21, 22, 23, each being aligned or coordinated with adjacent elements to achieve a desired magnetic property (e.g., for auto-location features or other features). Although illustrated as having one pole, it is understood that each element 20, 21, 22, 23 has two proper magnetic poles not labeled for clarity of illustration. Magnetic elements 11 and 14 may be embedded within a substrate in a thermally active process as described herein, for example, using a cooling mechanism to maintain desired magnetic properties. However, enhanced magnetic elements having thermal isolation layers to further facilitate retention of magnetic properties are also described herein.

Figure 1C:
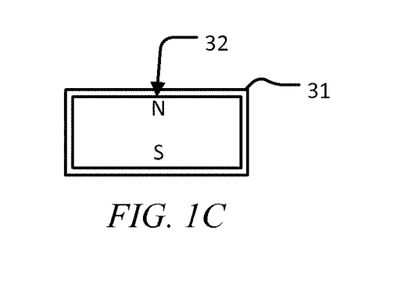
Figure 1D:
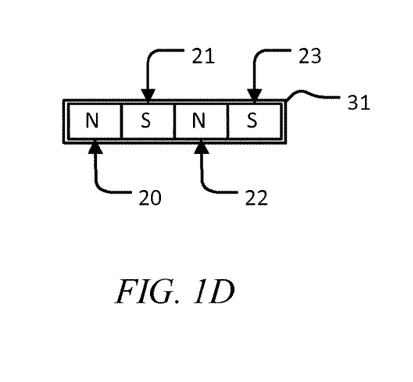
Figure 1E:
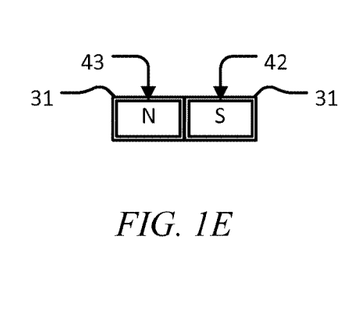

For example, as illustrated in FIG. 1C, magnetic element 32 may be encased or otherwise coated in a thermal isolation layer 31. The thermal isolation layer 31 can act to increase a thermal resistance between the magnetic element 32 and heat associated with an external environment. The thermal isolation layer 31 can effectively isolate the magnetic element 32 from the external environment. The thermal isolation layer 31 may include any suitable material, including, for example, leather, ceramic, polymer, rubber (synthetic or natural), and/or any other suitable material capable of at least partially increasing a thermal resistance between the magnetic element 32 and heat associated with an external environment. The thermal isolation layer 31 may be used to cover a plurality of individual magnetic elements as illustrated in FIG. 1D. Additionally, the thermal isolation layer 31 may be used to individually cover separate magnetic elements 42, 43 with individual isolation layers as illustrated in FIG. 1E.

Figure 2A:
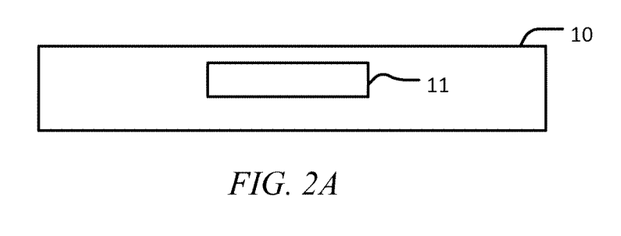
FIGS. 2A-2E show by way of example magnetic elements embedded within substrates formed through thermally active processes
Figure 2B:
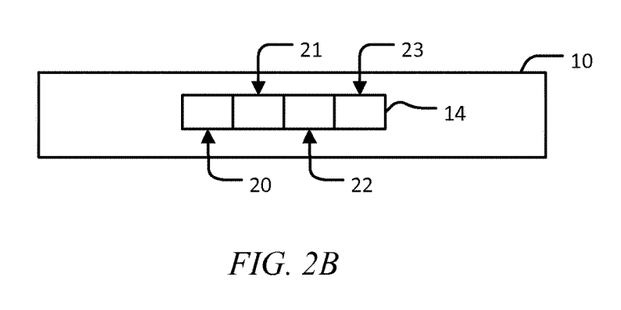

Turning now to FIGS. 2A-3E, several magnetic elements described above are illustrated embedded within substrates formed through a thermally active process. As depicted in FIG. 2A, magnetic element 11 is embedded within substrate 10, formed using a thermally active process. The thermally active process includes at least an injection molding process (used to create the substrate 10 while embedding element 11), molding magnetic element 11 in thermosets (such as, for example, compression molded rubbers), laminating magnetic element 11 inside of soft materials (such as stackups of TPU, neoprene, leather, cotton, microfibers, and polyesters), or other suitable processes. Although illustrated as a single layer, it is understood that the substrate 10 may include a plurality of differing layers, segments, or other portions not particularly illustrated. Similar to element 11, magnetic element 14 may also be embedded within substrate 14 as illustrated in FIG. 2B.

Figure 2C:
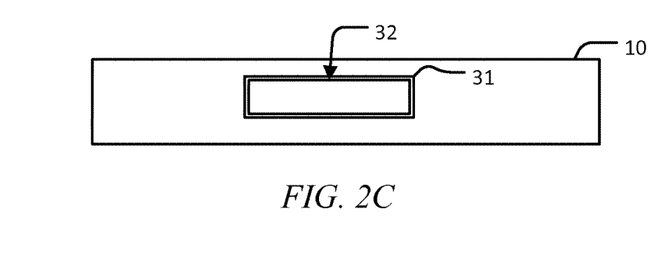
Figure 2D:
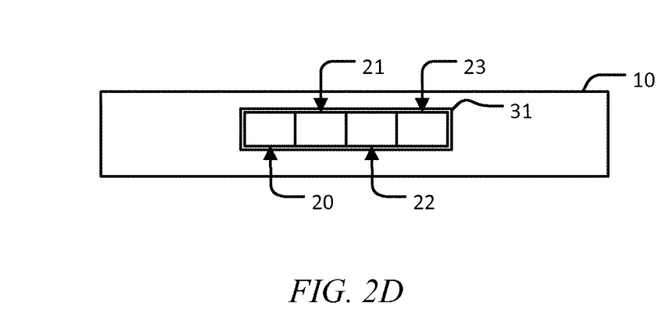
Figure 2E:
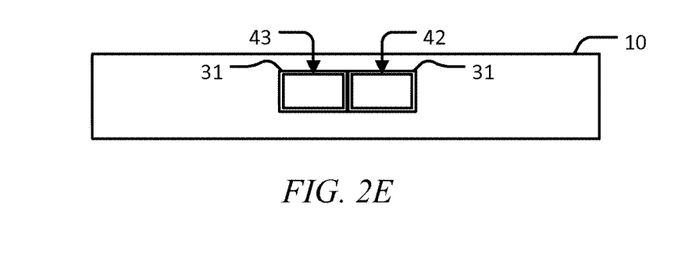

FIGS. 2C-2E also show magnetic elements 20, 21, 22, 23, 32, 42, 43 embedded within substrate 10. However, it is noted that as thermal isolation layer 31 is arranged to protect these elements, a cooling mechanism may or may not have been used for the entire thermally active manufacturing process (i.e., not run at full cooling capacity or otherwise altered to accommodate the isolation properties of layer 31). In some embodiments, the thermally active manufacturing process remains the same or similar across manufacturing of the substrates illustrated in FIGS. 2A-2E. In some other embodiments, the thermally active manufacturing process is slightly or significantly changed according to the type of magnetic element (i.e., linear array, multiple magnets, multiple arrays, etc) being embedded, the type of cooling mechanism or thermal isolation layer implemented, or other attributes.

The substrate 10 may differ from the particular forms illustrated and described above according to some embodiments. Furthermore, although illustrated as having magnetic elements totally embedded within the substrate 10, it should be understood that the same may be varied such that one or more surfaces of a magnetic element are exposed to an area external to the substrate (e.g., through a window, recess, against an exterior surface of the substrate, etc). Accordingly, the particular forms illustrated represent only several possible example implementations, and are in no way limiting.

Figure 3:
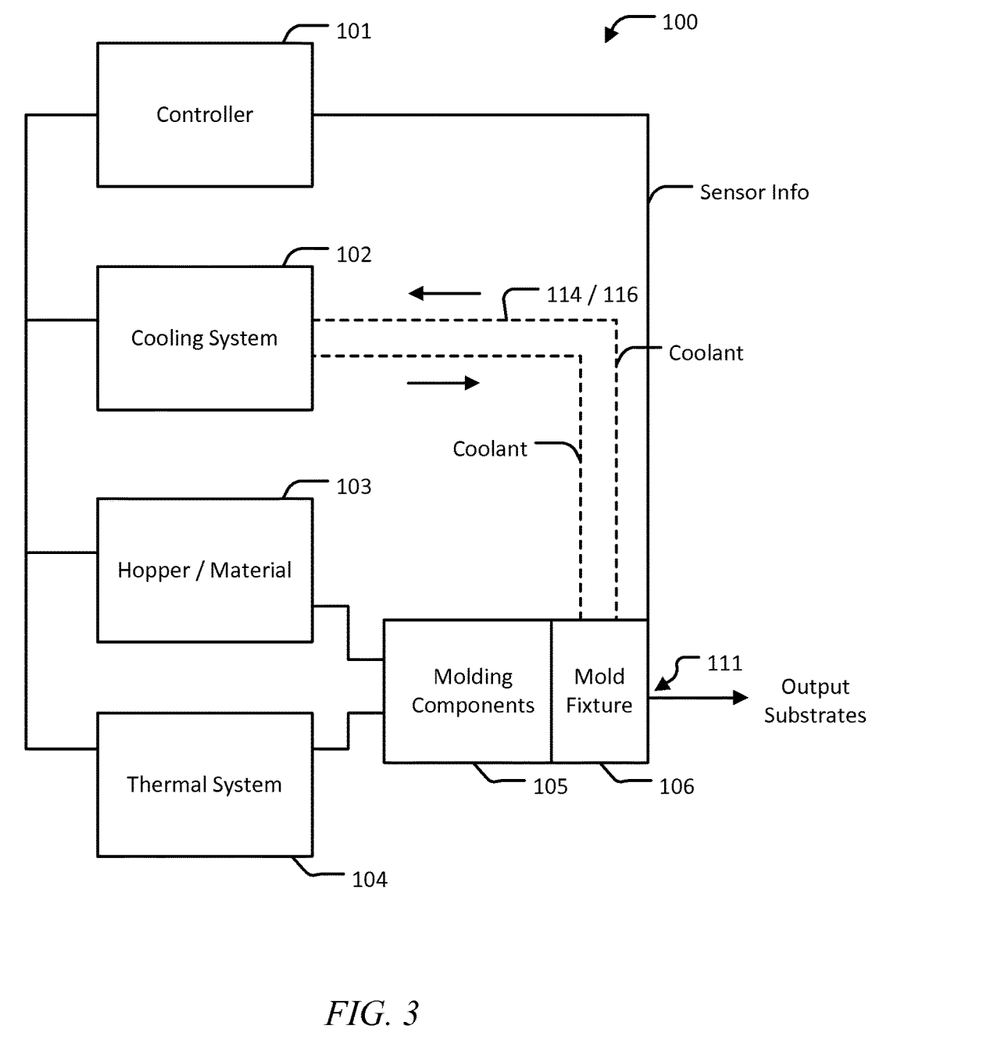
FIG. 3 shows a manufacturing system in according with the described embodiments.

The substrate 10 illustrated in FIGS. 2A-2E may be formed in any suitable system. According to one embodiment, FIG. 3 shows an exemplary system 100 for forming substrates with magnets embedded therein. The system 100 may include a controller 101 arranged to control the system 100. The controller 101 may include any suitable controller, including a programmable logic controller, computer processer, or any other suitable controller.

The system 100 further includes cooling system 102 in communication with the controller 101. The cooling system 102 may include a cooling mechanism configured to provide or cycle coolant through the system 100 based on commands from the controller 101 or through other manners (e.g., by opening of a valve by controller 101, by receipt of a signal from controller 101, etc). Generally, the cooling system 102 may include any suitable components for operation, including heat exchangers, pumps, valves, and any other cooling component.

The system 100 further includes a Hopper/Material Provision Component 103 in communication with controller 101. The hopper 103 may provide ingots, pellets, pieces, or otherwise configured material for the thermally active manufacturing process implemented by system 100. The hopper 103 may receive commands to begin operation or provision of material from controller 101, or may be otherwise controlled (e.g., by a user/technician, through machine interlocks from another component, system, or machine, etc).

The system 100 further includes thermal system 104 in communication with the controller 101. The thermal system 104 may include a power source (or may receive power external thereto) and may be configured to heat a portion of the system 100 (e.g., a die or manufacturing implement such as a fixture, a mixing nozzle, etc) to melt or otherwise transform material provided through the hopper 103 at molding components 105 and mold fixture 106. As material is provided from hopper 103, molding components 105 receive the material, heat and at least partially melt the material, and mold the same in mold fixture 106 to form a substrate (e.g., 10) with a magnetic element embedded therein. Generally, cooling system 102 maintains an acceptable temperature about the magnetic element or elements in the mold fixture 106 such that desirable magnetic properties are maintained.

Figure 4A:
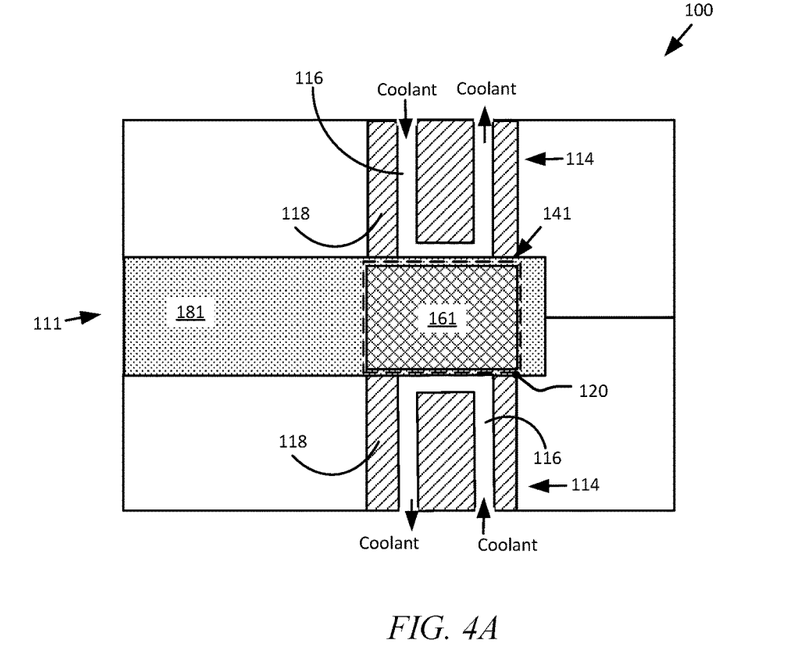
FIGS. 4A-4B show manufacturing fixtures of a manufacturing system in accordance with the described embodiments.

FIG. 4A shows a detailed view of a fixture portion (e.g., 105/106) of system 100 in accordance with the described embodiments. System 100 can include the fixture 106 that can include temperature controlled region 141 suitably sized and shaped to accommodate magnetic element 161, for example, by way of a magnetic element retention feature, indentations, standoffs, or any other suitable feature. In some embodiments, magnetic element 161 can be surrounded by a thermal isolation layer (e.g., 31; not shown here) that can provide additional thermal isolation between magnetic element 161 and embeddant 181 (such as thermoplastic resin, rubber, elastomer, etc) injected into cavity 111 during a thermally active manufacturing process (such as injection molding process). In order to maintain magnetic element within an acceptable temperature range, sensor 120 (e.g., thermocouple, magnetometer, diode, etc) can provide information to a processor (e.g., controller 101) that can control an amount of coolant provided through cooling system portion 114 (e.g., shown coupled to cooling system 102). Cooling system 102 is an active cooling system as it is configured to circulate coolant through system 100. In one embodiment, cooling system portion 114 can include conduits 116 that can direct coolant to temperature controlled region 141. In some cases, the coolant can be in direct thermal contact with magnetic element 161 using a thermal conductor (not shown) between the coolant and magnetic element 161. In order to prevent undo exposure of embeddant 181 to the coolant (with a possible adverse affect on the properties of embeddant 181) the coolant can be thermally isolated from cavity 111. For example, cooling system portion 114 can include jacket 118 formed of thermally insulating material having the effect of limiting the thermal effects of the coolant to only magnetic element 161.

Figure 4B:
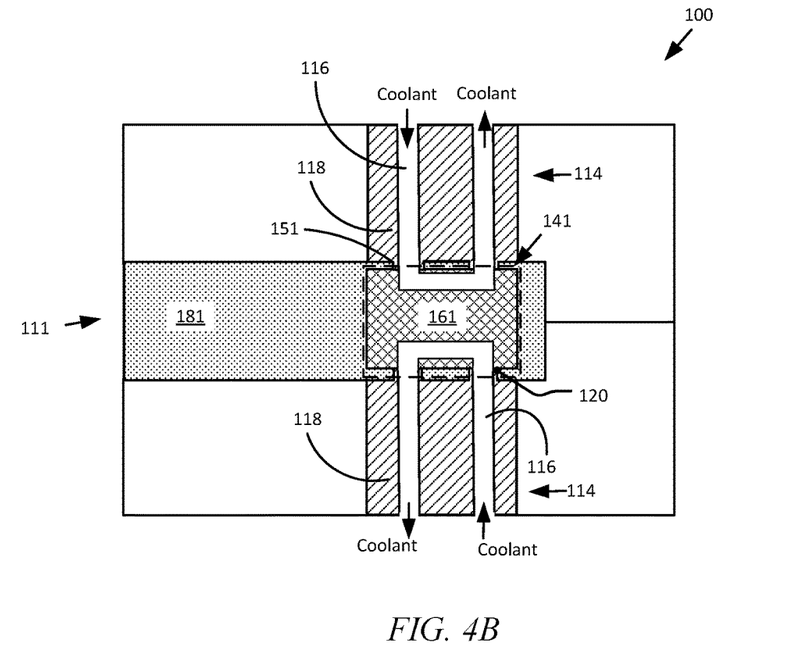

An alternative embodiment is illustrated in FIG. 4B in which the coolant is configured to flow through a portion of magnetic element 161. Interfaces 151 can be provided to interface with a conduit disposed within magnetic element 161 to facilitate coolant transfer between mold 100 and magnetic element 161. Interfaces 151 can be configured to position magnetic element 161 within mold 100. Furthermore, interfaces 151 can include seals that couple with corresponding ones of a number of conduit openings in magnetic element 161. The seals are operative to establish a secure channel between interfaces 151 and magnetic element 161, such that coolant is prevented from escaping into the mold cavity during an injection molding operation. In this way, the coolant can come into direct contact with magnetic element 161, thereby allowing heat to be removed by direct thermal conduction between the coolant and magnetic element 161. In such a configuration sensor 120 can be disposed on a surface of one of interfaces 151 such that sensor 120 can be in close proximity to magnetic element 161.

Figure 5:
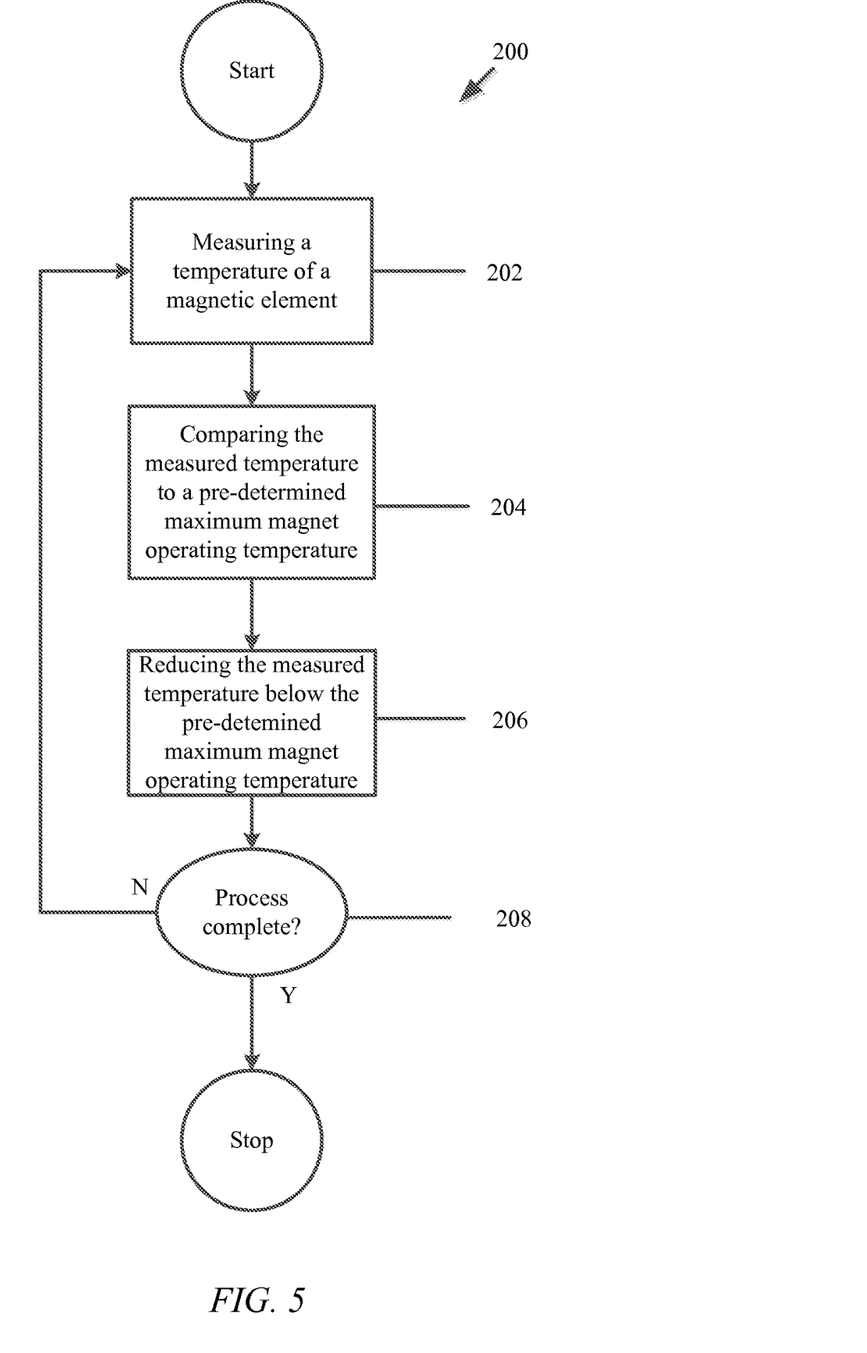
FIG. 5 is a flow chart of a process in accordance with the described embodiments.

FIG. 5 is a flow chart of process 200 for maintaining magnetic properties of a magnetic element during a thermally active manufacturing process in accordance with the described embodiments. Process 200 begins at 202 by measuring a property of the magnetic element. In one embodiment, the property is a temperature of the magnetic element (or a magnetic property of the magnetic element). At 204, the measured temperature is compared to a maximum operating temperature of the magnetic element. If the measured temperature is greater or within a predetermined range of the maximum operating temperature of the magnetic element that does not exceed the maximum operating temperature, then the temperature of the magnetic element is reduced at 206. At 208, if the process is not complete than control is passed back to 202, otherwise, process 200 ends.

Figure 6:
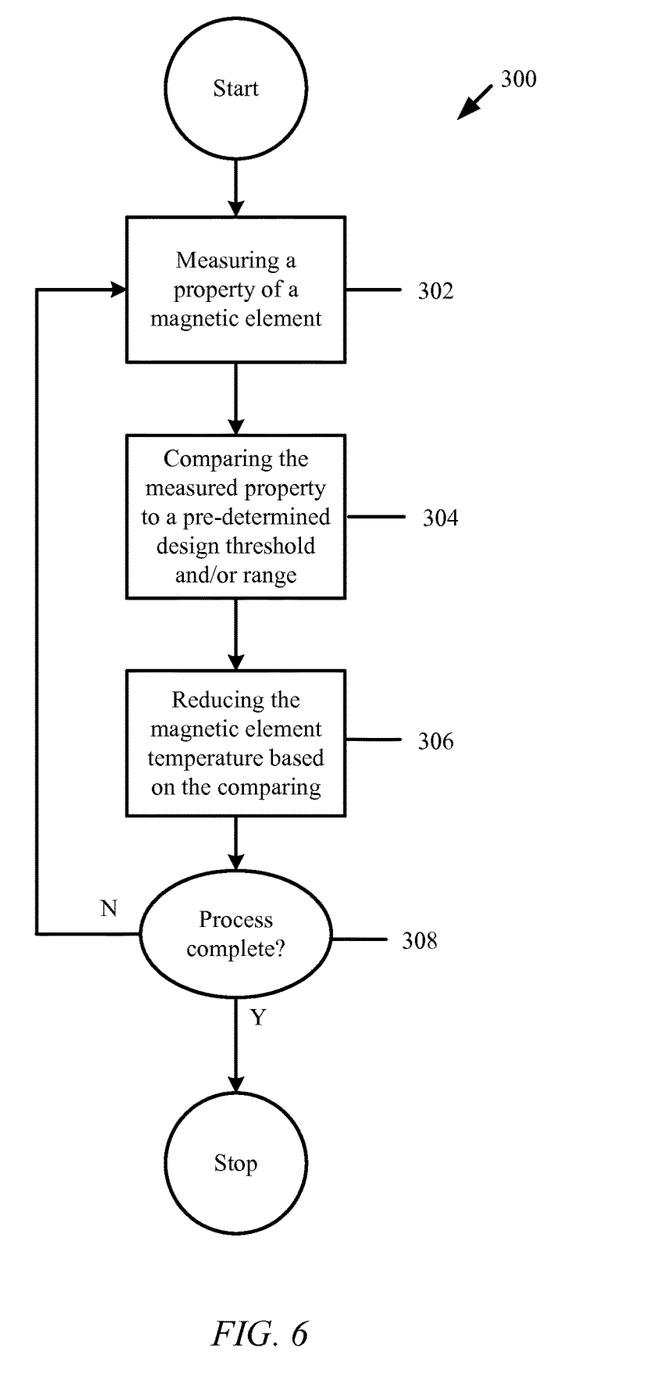
FIG. 6 is a flow chart of a process in accordance with the described embodiments.

FIG. 6 is a flow chart of process 300 for maintaining magnetic properties of a magnetic element during a thermally active manufacturing process in accordance with the described embodiments. Process 300 begins at 302 by measuring a property of the magnetic element. In the illustrated embodiment, the property is a magnetic flux density of the magnetic element (or another magnetic property of the magnetic element). At 304, the measured property is compared to a design threshold of the magnetic element. If the measured property is within a predetermined range of the design threshold of the magnetic element, then the temperature of the magnetic element is reduced at 306 to maintain the desired design threshold and/or measured magnetic property. At 308, if the process is not complete than control is passed back to 302, otherwise, process 300 ends.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A fixturing device for maintaining a magnetic flux density of a magnetic element during a thermally active manufacturing process, the fixturing device comprising:
    a fixturing device housing having walls that define a cavity that is capable of receiving the magnetic element;
    a magnetometer configured to measure a change in the magnetic flux density of the magnetic element;
    a cooling mechanism in communication with the magnetometer and having a channel embedded at least partially within the magnetic element; and
    a feedback control mechanism in communication with the cooling mechanism and configured to receive the change in the magnetic flux density from the magnetometer, wherein the feedback control mechanism is capable of (i) comparing the change in the magnetic flux density to a pre-determined range of magnetic flux density, and (ii) activating the cooling mechanism to move coolant medium through the channel to directly cool the magnetic element during the thermally active manufacturing process in response to determining that the change in the magnetic flux density is outside the pre-determined range.

2. The fixturing device as recited in claim 1, wherein the magnetic element includes a plurality of magnets and the cooling mechanism is configured to receive heat directly from the plurality of magnets.

3. The fixturing device as recited in claim 1, wherein the magnetic element is a high flux density magnet or magnetic array.

4. The fixturing device as recited in claim 1, wherein the channel comprises seals that prevent the coolant medium from passing through the walls that define the cavity.

5. The fixturing device as recited in claim 1, wherein the walls confine the magnetic element within the cavity.

6. The fixturing device as recited in claim 1, wherein the channel includes a thermal insulated jacket that is configured to limit cooling to the magnetic element.

7. The fixturing device as recited in claim 1, wherein a rate of moving the coolant medium through the channel corresponds to the change in the magnetic flux density of the magnetic element.

8. The fixturing device as recited in claim 1, wherein the magnetic element is encased within a thermal isolation layer.

* * * * *